(12) United States Patent
Gao et al.

(10) Patent No.: US 9,047,015 B2
(45) Date of Patent: Jun. 2, 2015

(54) MIGRATING THIN-PROVISIONED VOLUMES IN TIERED STORAGE ARCHITECTURES

(75) Inventors: Xue Dong Gao, Shanghai (CN); Kurt A. Lovrien, Tucson, AZ (US); Richard A. Ripberger, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 13/447,120

(22) Filed: Apr. 13, 2012

(65) Prior Publication Data

US 2013/0275694 A1 Oct. 17, 2013

(51) Int. Cl.
*G06F 3/06* (2006.01)
*G06F 5/06* (2006.01)
*G06F 13/12* (2006.01)

(52) U.S. Cl.
CPC .............. *G06F 3/0605* (2013.01); *G06F 5/06* (2013.01); *G06F 13/12* (2013.01); *G06F 3/0649* (2013.01); *G06F 3/0665* (2013.01); *G06F 3/0685* (2013.01)

(58) Field of Classification Search
CPC . G06F 3/0647; G06F 17/30079; G06F 12/00; G06F 12/02
USPC .................. 711/103, 165, 113, 166, 135, 162
See application file for complete search history.

(56) References Cited

U.S. PATENT DOCUMENTS

| | | | |
|---|---|---|---|
| 7,945,748 B2 | 5/2011 | Shibayama et al. | |
| 2007/0239954 A1 | 10/2007 | Sakashita et al. | |
| 2008/0168220 A1* | 7/2008 | Gill et al. ................. | 711/113 |
| 2010/0082765 A1 | 4/2010 | Murase | |
| 2010/0185814 A1 | 7/2010 | Kano et al. | |
| 2010/0205390 A1 | 8/2010 | Arakawa | |
| 2011/0191563 A1* | 8/2011 | Acedo et al. .............. | 711/166 |
| 2011/0282835 A1* | 11/2011 | Cannon et al. ............. | 707/622 |
| 2012/0124294 A1* | 5/2012 | Atkisson et al. ........... | 711/135 |
| 2012/0246201 A1* | 9/2012 | Starr et al. ................ | 707/809 |

* cited by examiner

*Primary Examiner* — Jared Rutz
*Assistant Examiner* — Christopher Do
(74) *Attorney, Agent, or Firm* — Nelson and Nelson; Daniel P. Nelson; Alexis V. Nelson (57) ABSTRACT

A method for migrating volumes in a storage system includes identifying an extent of data (belonging to a volume) requiring migration from a source extent to a target extent. The method allocates a selected number of copiers to the extent of data to migrate the extent of data from the source extent to the target extent. Each copier is configured to copy a unit of data, which is a smaller division of the extent of data. The method monitors destages (i.e., writes) that occur to the source extent as the copiers migrate the extent of data from the source extent to the target extent. In the event the destages occur faster than the copiers can copy units to the target extent, the method allocates additional copiers to the extent of data to assist in migrating the extent of data. A corresponding apparatus and computer program product are also disclosed.

24 Claims, 9 Drawing Sheets

MIGRATING THIN-PROVISIONED VOLUMES IN TIERED STORAGE ARCHITECTURES

BACKGROUND

1. Field of the Invention

This invention relates to apparatus and methods for migrating data, and more particularly to apparatus and methods for migrating thin-provisioned volumes in tiered storage architectures.

2. Background of the Invention

Customer growth over time varies and is often difficult to predict. As a result, it is often difficult to design and allocate storage resources that will adequately accommodate customer growth over a period of time while still ensuring that the storage resources are used in an efficient manner. Allocated but unused storage space increases up front costs, hardware, and power consumption. Thus, there is a powerful incentive to ensure that storage resources are allocated in an efficient manner. This involves a careful balancing act to ensure that enough storage space is available to accommodate growth while not allocating too much storage space that unnecessarily increases costs.

One current solution to the above-stated problem is to implement thin provisioning. Thin provisioning allows storage space to be allocated on a just-enough and just-in-time basis as data is written. This differs from conventional storage allocation techniques (also called "fat provisioning") which allocates storage space up front and often results in large amounts of unused storage space. Thin provisioning, by comparison, eliminates most of the free space in storage volumes and helps to avoid poor storage utilization rates, often as low as ten percent, that occur using traditional "fat provisioning" allocation techniques. When properly implemented, thin provisioning can significantly reduce the amount of time system administrators spend allocating and managing storage.

In tiered storage architectures, different types of data are stored on different types of storage media in order to reduce total storage cost. The media on which data is stored may be based on desired levels of protection, performance requirements, frequency of use, and other considerations. As the characteristics of the data change, the data may be moved between tiers. For example, data that is accessed more frequency (i.e., is "hotter") may be moved to faster storage media to improve performance. Unfortunately, some tiered storage architectures do not support migrating thin-provisioned volumes from one storage tier to another. This can be a disadvantage as both tiered storage architectures and thin-provisioning become more common.

In view of the foregoing, what are needed are apparatus and methods to migrate thin-provisioned volumes between tiers of a tiered storage architecture. Ideally, such apparatus and methods will also be effective to migrate standard volumes. Further needed are apparatus and methods to enable standard volumes to be converted to thin-provisioned volumes at the time of migration.

SUMMARY

The invention has been developed in response to the present state of the art and, in particular, in response to the problems and needs in the art that have not yet been fully solved by currently available apparatus and methods. Accordingly, the invention has been developed to provide apparatus and methods to migrate volumes in tiered storage architectures. The features and advantages of the invention will become more fully apparent from the following description and appended claims, or may be learned by practice of the invention as set forth hereinafter.

Consistent with the foregoing, a method for migrating volumes in a storage system is disclosed. In one embodiment, such a method includes identifying an extent of data (belonging to a volume) requiring migration from a source extent to a target extent. The method allocates a selected number of copiers to the extent of data to migrate the extent of data from the source extent to the target extent. Each copier is configured to copy a unit of data, where a unit is a smaller division of the extent of data. The method monitors destages (i.e., writes) that occur to the source extent as the copiers migrate the extent of data from the source extent to the target extent. In the event the destages occur faster than the copiers can copy units to the target extent, the method allocates additional copiers to the extent of data to assist in migrating the extent of data.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
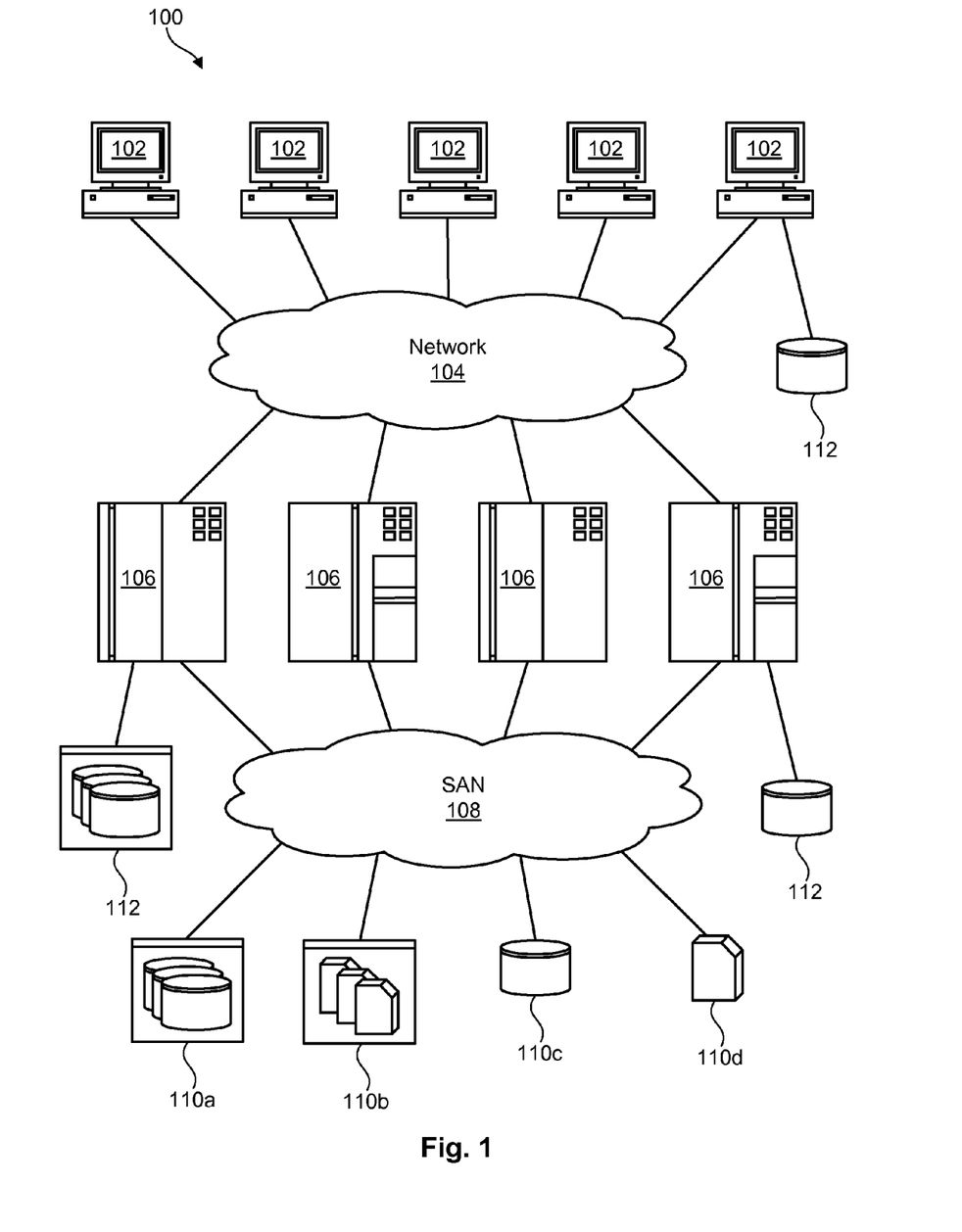
FIG. 1 is a high-level block diagram showing one example of a network environment where an apparatus and method in accordance with the invention may be implemented.

Referring to FIG. 1, one example of a network architecture 100 is illustrated. The network architecture 100 is presented to show one example of an environment where various embodiments of the invention may operate. The network architecture 100 is presented only by way of example and not limitation. Indeed, the a and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
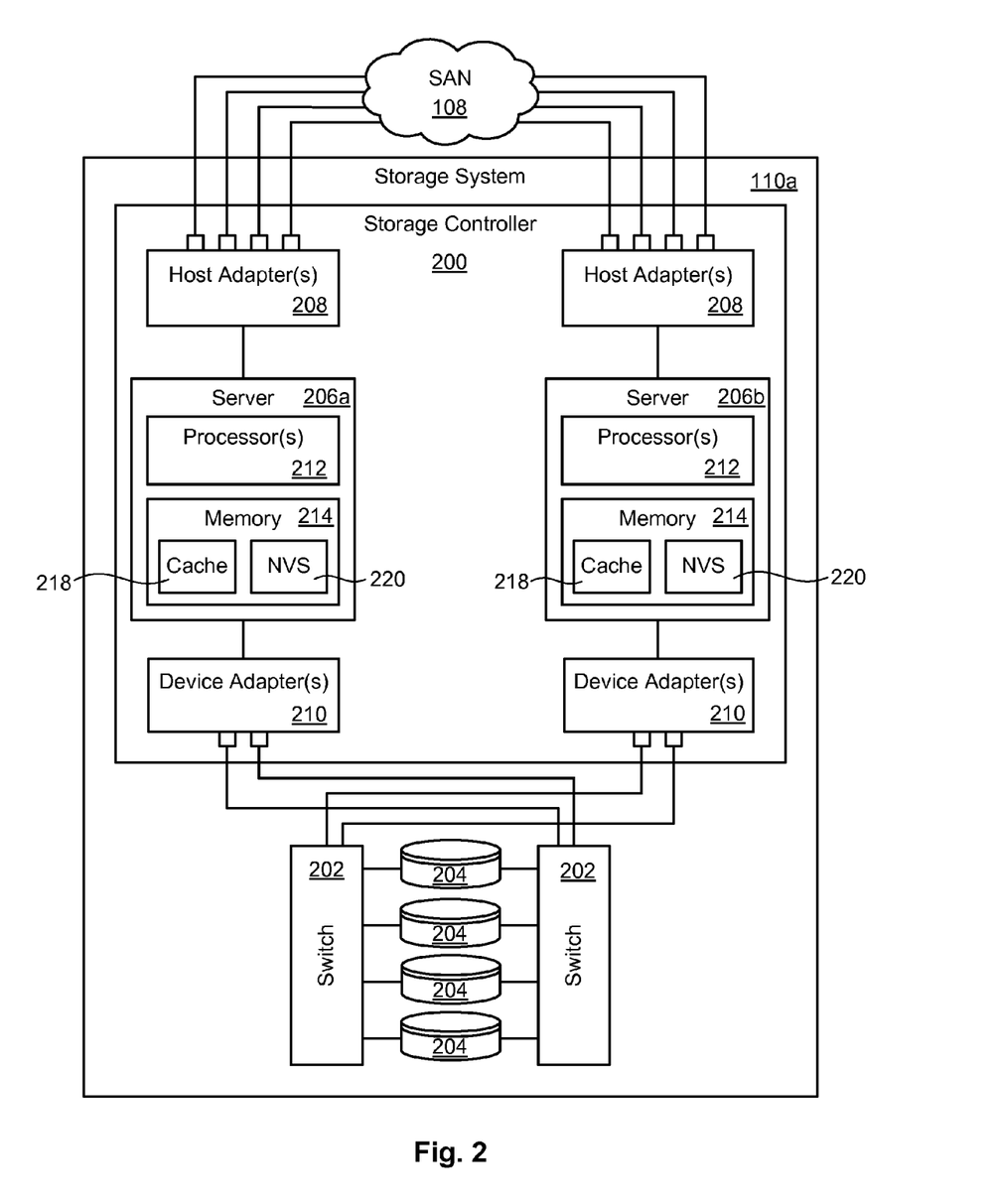
FIG. 2 is a high-level block diagram showing one example of a storage system where an apparatus and method in accordance with the invention may be implemented.

Referring to FIG. 2, one embodiment of a storage system 110a containing an array of storage drives 204 (e.g., hard-disk drives and/or solid-state drives) is illustrated. The internal components of the storage system 110a are shown since the apparatus and methods disclosed herein may, in certain embodiments, be implemented within such a storage system 110a, although the systems and methods may also be applicable to other storage systems or groups of storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the apparatus and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
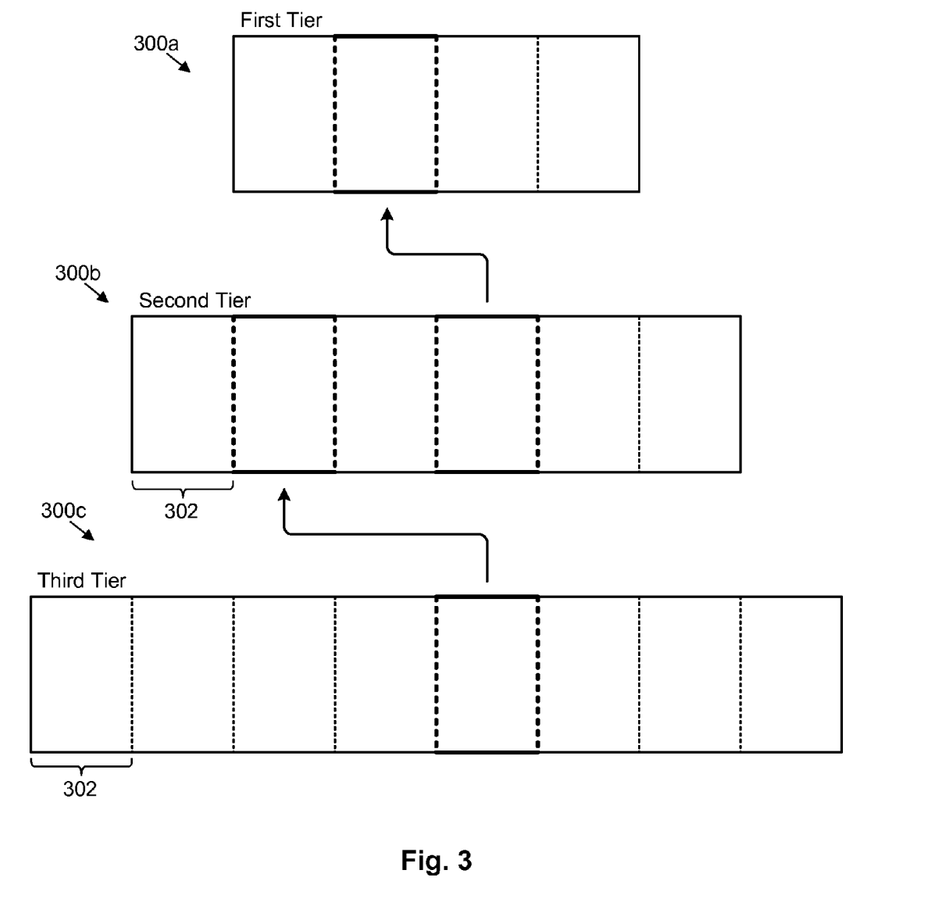
FIG. 3 is a high-level block diagram showing the movement of extents between tiers of a tiered storage architecture.

Referring to FIG. 3, in certain embodiments, a storage system 110a such as that illustrated in FIG. 2 may be configured with different storage tiers 300. Each of the storage tiers 300 may contain different types of storage media having different performance and/or cost. Higher cost storage media is generally faster while lower cost storage media is generally slower. Because of its reduced cost, the tiered storage architecture may include substantially more storage capacity for lower cost storage media than higher cost storage media. Storage management software and/or firmware running on a host device 106 or the storage system 110a may automatically move data between higher cost and lower cost storage media to optimize performance. For example, hotter data (i.e., data that is accessed more frequently) may be promoted to faster storage media while colder data (i.e., data that is accessed less frequently) may be demoted to slower storage media. As the hotness and coldness of data changes, the data may be migrated between the storage tiers.

The storage media used to implement the storage tiers 300 may vary. In one example, a first storage tier 300a includes high-speed memory, such as the DRAM cache 218 previously mentioned, a second storage tier 300b includes solid-state drives, and a third storage tier 300c includes hard-disk drives. In this example, due to the cost of the storage media, the second storage tier 300b has more storage capacity than the first storage tier 300a, and the third storage tier 300c has more storage capacity than the second storage tier 300b.

In tiered storage architectures, data may be moved between storage tiers 300 in equal-sized partitions or allocations, referred to as "extents." In conventional tiered storage architectures, the extent size is typically consistent across the different storage tiers 300a, 300b, 300c. In one example, the total address space of the storage tiers 300b, 300c, is divided into 1 GB extents. One GB extents of data may then be moved between the storage tiers 300 as the hotness or coldness of the data changes.

In certain embodiments, a control structure is maintained to keep track of logical volumes on the storage system 110a. Each logical volume may have one or more logical extents associated therewith. Each logical extent may point to or be associated with a physical extent 302 on the storage media 300. As data is moved from one physical extent 302 to another, such as from a physical extent 302 on one storage tier 300c to a physical extent 302 on another storage tier 300b, the pointer associated with the logical extent may be updated to point to the new physical extent 302. In this way, the control structure may keep track of logical and physical extents that are associated with a logical volume.

Figure 4:
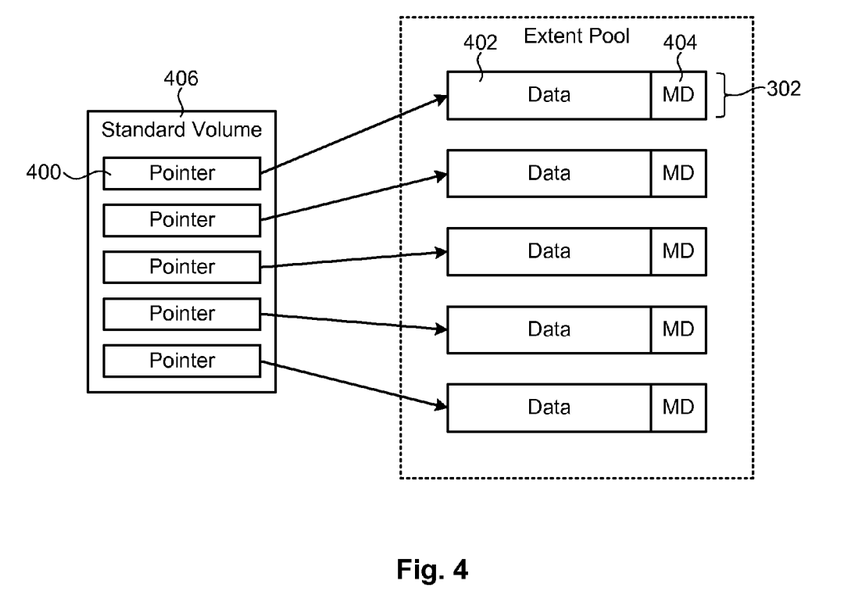
FIG. 4 is a high-level block diagram showing how data and metadata may be organized for a standard volume.
Figure 5:
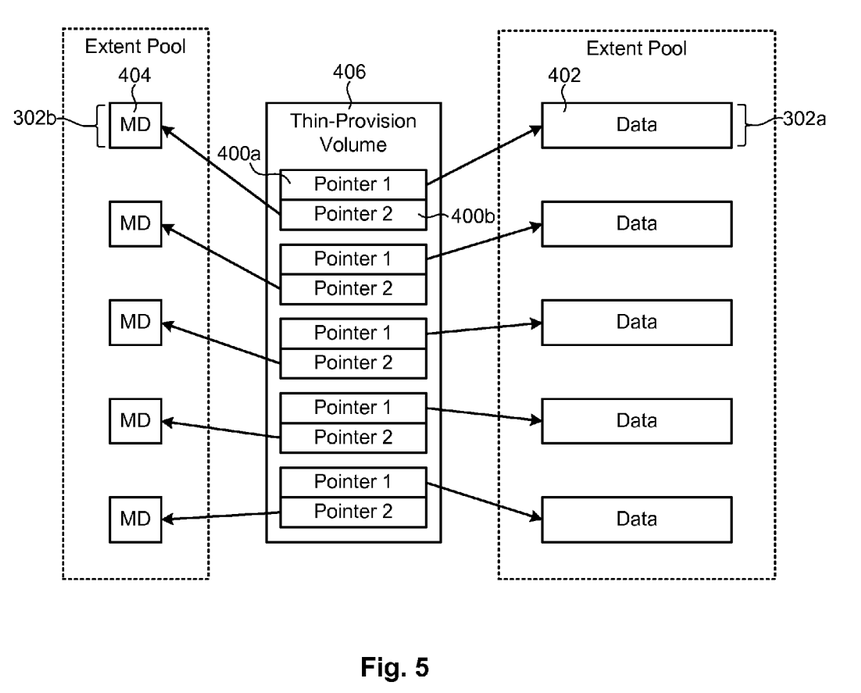
FIG. 5 is a high-level block diagram showing how data and metadata may be organized for a thin-provisioned volume.

Referring to FIGS. 4 and 5, in certain embodiments, the data and metadata of standard volumes and thin-provisioned volumes is organized differently. FIG. 4 shows one example of how data and metadata may be organized for a standard volume. FIG. 5 shows one example of how data and metadata may be organized for a thin-provisioned volume.

As shown in FIG. 4, in certain embodiments, the data 402 and metadata 404 associated with a logical extent of a standard volume may be tied together such that a control structure 406 only needs a single pointer 400 to identify the physical location of the data 402 and metadata 404. When the data 402 and metadata 404 contained in an extent is migrated from one physical extent 302 to another, the pointer 400 may be updated to point to the new physical extent.

As shown in FIG. 5, by contrast, in certain embodiments, the data 402 and metadata 404 in thin-provisioned volumes may be independent from one another. That is, the data 402 and metadata 404 may be located in different physical extents 302a, 302b and manipulated independently. In certain embodiments, for each logical extent associated with a thin-provisioned volume, the control structure 406 includes a first pointer 400a that points to a physical extent 302a that contains the data 402, and a second pointer 400b that points to a physical extent 302b that contains the metadata 404. In certain embodiments, each metadata extent 302b in a thin-provisioned volume is a virtual extent that maps into a data extent 302a.

As will be explained in more detail hereafter, in certain cases, it may be desirable to convert standard volumes to thin-provisioned volumes to more efficiently utilize storage space on a storage system 110a. In certain embodiments, this conversion may be performed when migrating standard volumes. That is, when a standard volume is migrated in a storage system 110a, such as between storage tiers 300, the control structure 406 may be modified to include separate pointers 400a, 400b for data 402 and metadata 404, as opposed to a single pointer 400. Similarly, the data 402 and metadata 404 may be stored in different physical extents 302a, 302b, as opposed to a single physical extent 302. The data 402 and metadata 404 may then be migrated independently. Any empty (e.g., zeroed) extents of the standard volumes may be released to free up storage when the standard volumes are converted to thin-provisioned volumes. If data extents 302a are released from a thin-provisioned volume, the pointers 400a to these extents 302a may be modified to contain null values to indicate that the extents are no longer allocated.

Figure 6:
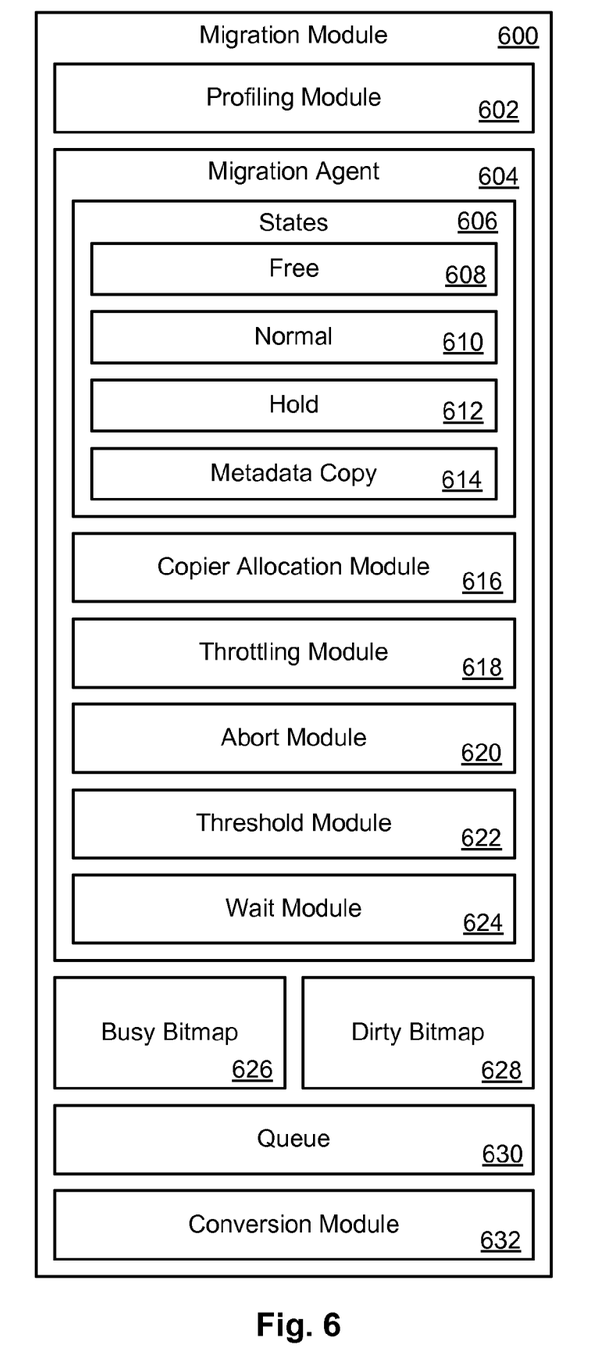
FIG. 6 is a high-level block diagram showing one embodiment of a migration module in accordance with the invention.

Referring to FIG. 6, in certain embodiments, a migration module 600 in accordance with the invention is configured to migrate standard and/or thin-provisioned volumes in a tiered storage architecture. The migration module 600 may be implemented in hardware, software, or a combination thereof. The migration module 600 may include various internal modules or component to provide various features or functions, as will be explained in more detail hereafter.

For example, in certain embodiments, the migration module 600 includes a profiling module 602 to profile volumes in the storage system 110a. In certain embodiments, the profiling module 602 profiles volumes at the granularity of an extent. The profiles of the extents may be analyzed to optimally move extents in the tiered storage architecture. For example, in certain embodiments, the profiling module 602 tracks accesses to extents over time. Hotter data (i.e., data that is accessed more frequently) may be promoted to faster storage media while colder data (i.e., data that is accessed less frequently) may be demoted to slower storage media. As the hotness and coldness of the extents change, the extents may be moved between the storage tiers accordingly.

In certain embodiments, a migration agent 604 may govern the migration of an extent of data between two physical extents in the tiered storage architecture. For a standard volume, data and metadata may be migrated together. For a thin-provisioned volume, the migration may be divided into two parts: data migration and metadata migration.

In certain embodiments, the migration agent 604 may operate in one of several different states: a "free" state 608, a "normal" state 610, a "hold" state 612, and a "metadata copy" state 614. The behavior of the migration agent 604 may vary in accordance with its state. Similarly, different events or conditions may cause the migration agent 604 to transition between states.

Figure 7:
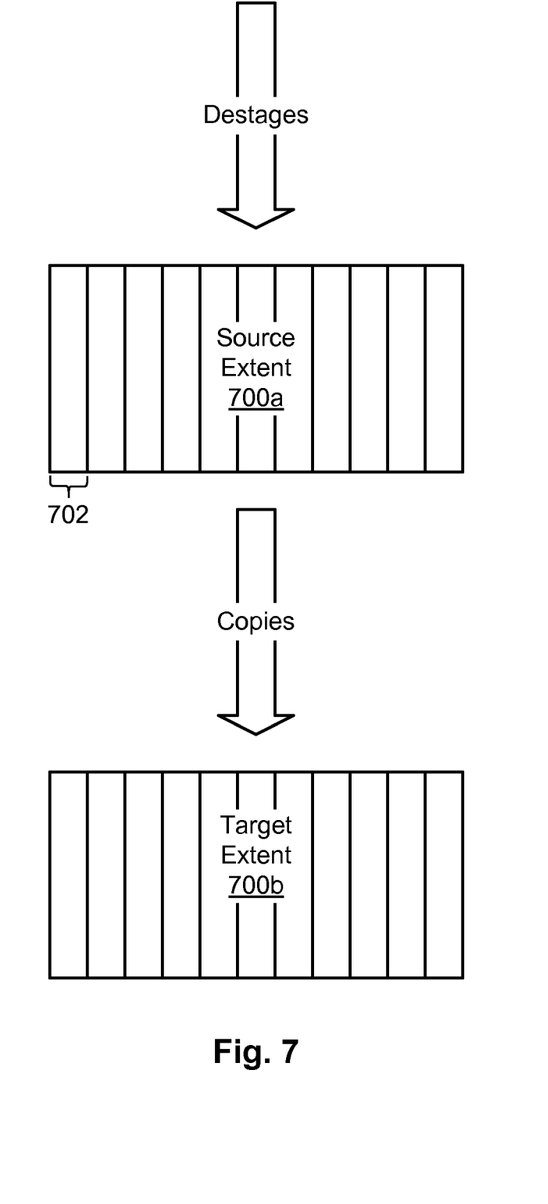
FIG. 7 is a high-level block diagram showing the migration of data and/or metadata from a source extent to a target extent.

Referring to FIG. 7, while continuing to refer generally to FIG. 6, when a migration agent 604 is in the "free" state 608, the migration agent 604 may be assigned an extent migration job. When the migration agent 604 receives a new job, the migration agent 604 may transition to "normal" state 610 and a copier allocation module 616 within the migration agent 604 may begin to allocate copiers to start copying units 702 of data from a source extent 700a to a target extent 700b. For the purposes of this disclosure, a "unit" 702 is a data portion or element within an extent, such as a stripe 702 of data where the extent 700a is implemented in a redundant array of independent disks (RAID). In certain embodiments, each unit 702 contains smaller subdivisions (not shown) referred to as "tracks."

In the "normal" state 610, the migration agent 604 may allocate some minimum number (e.g., six) of copiers to begin copying units 702 from the source extent 700a to the target extent 700b. Destages from cache 218 to the source extent 700a may be allowed while the copying is taking place. Thus, in the "normal" state 610, a race may occur between destages and the copiers. If destages overwhelm the copiers, the copier allocation module 616 may attempt to allocate additional copiers so that data is copied to the target extent 700b faster than destages are occurring to the source extent 700a.

In certain embodiments, the copier allocation module 616 will attempt to allocate additional copiers up to some maximum number (e.g., twenty) to increase the copy bandwidth. If the copier allocation module 616 reaches the maximum number of copiers and destages are occurring faster than the copiers can copy units to the target extent 700b, a throttling module 618 may attempt to throttle back the destages to a level where they do not overwhelm the copiers. In certain embodiments, the throttling module 618 throttles back the destages by holding the destages in a queue 630, and then releasing the destages from the queue 630 at a rate slower than the copy rate of the copiers. In one example, the throttling module 618 releases three destages for every four units that are copied by the copiers. This will allow copies to the target extent 700b to occur faster than destages to the source extent 700a. Other ratios of copies to destages are also possible and within the scope of the invention.

If a destage occurs to a unit 702 while the unit is being copied from the source extent 700a to the target extent 700b, an abort module 620 may abort the copy. Once the destage is complete, the unit 702 may be copied to the target extent 700b.

Since migrating data creates additional loads on the storage devices 300 and the bandwidth of the copiers affects the response times for host I/O, there is a tradeoff between data migration speed and host I/O response times. In certain embodiments, a user may be able to configure the copier allocation module 616 to make the copiers more aggressive, thereby completing migrations sooner, or less aggressive to reduce the impact on host I/O. For example, in certain embodiments, a user may be provided the option to increase or decrease the maximum number of copiers that may be assigned to a copying task. In other embodiments, a user may be provided the option to alter the ratio of copies to destages.

When a threshold module 622 detects that the number of uncopied units 702 has fallen below a specific threshold (e.g., half the total number of copiers), the migration agent 604 transitions to a "hold" state 612. In this state 612, the migration agent 604 may allow copiers to finish copying units 702 from the source extent 700a to the target extent 700b. If the extent being migrated is associated with a standard volume, a wait module 624 within the migration agent 604 also waits for ongoing destages to the metadata 404 to complete while in the "hold" state 612.

During the "normal" and "hold" states 610, 612, destages to data 402 may be tracked using busy and dirty bitmaps 626, 628 on a track-by-track basis. Each bit of the busy bitmap 626 may indicate when a corresponding track is busy (e.g., being overwritten by a destage), while each bit of the dirty bitmap 628 may indicate when a corresponding track has been "dirtied" (e.g., overwritten by a destage). If a bit is set in the dirty bitmap 628, this indicates that the corresponding track is dirty and needs to be copied to the target extent 700b. If a track is dirtied after it has been copied to the source extent 700a, a copier will need to copy the track again and reset the corresponding bit in the dirty bitmap 628. Stages to data and, for standard volumes, stages and destages to metadata, may be tracked by test control block (TCB) job, as opposed to on a track-by-track basis.

When the migration agent 604 is in the "hold" state 612, only stages to data are allowed. In the case of standard volumes, stages to metadata 404 (which is tied to the data 402) are also allowed. When there are no more dirty tracks to copy and no more destages to data 402 (and metadata 404 in the case of standard volumes), the migration agent 604 switches to the "metadata copy" state 614.

For standard volumes, while in the "metadata copy" state 614, the migration agent 604 dispatches copiers to copy metadata 404 from the source extent 700a to the target extent 700b. Because the amount of metadata 404 is relatively small compared to the amount of data 402, all destages to the metadata 404 may be held in the queue 630 while the metadata 404 is being copied from the source extent 700a to the target extent 700b. Stages to the metadata 404, however, may be allowed during this period.

For thin-provisioned volumes, the metadata 404 is in an extent separate from the data 402 and thus is migrated independently. When migrating metadata 404, the migration agent 604 transitions directly to the "hold" state 612 (i.e., skipping the "normal" state). The migration agent 604 then transitions to the "metadata copy" state 614. After the metadata 404 is copied to the target extent 302b, the migration agent 604 will update the metadata pointer 400b associated with the metadata 404 (See FIG. 5) to point to the target extent 302b.

As shown in FIG. 6, the migration agent 604 includes a conversion module 632. When a standard volume is migrated, the conversion module 632 may optionally convert the standard volume to a thin-provisioned volume. More specifically, the conversion module 632 may convert the metadata 404 of the standard volume to metadata 404 associated with a thin-provisioned volume, as shown in FIGS. 4 and 5.

Figure 8:
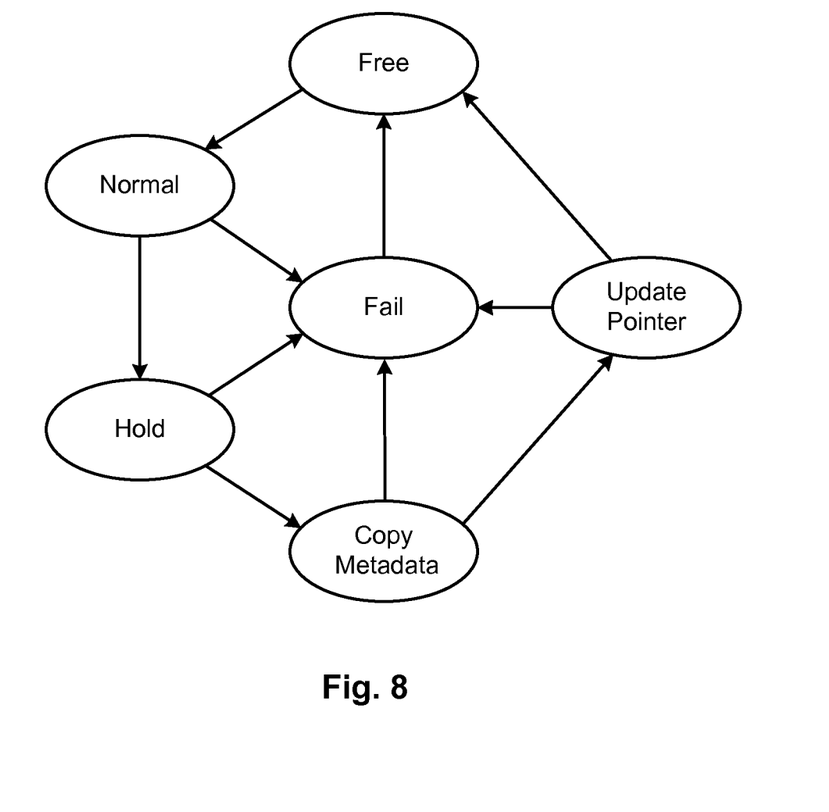
FIG. 8 is a state diagram showing transitions between states when copying data from a source extent to a target extent.

FIG. 8 shows a state diagram for the migration agent 604 when copying data from a source extent 700a to a target extent 700b. As shown, the migration agent 604 begins in the "free" state 608 and then transitions to the "normal" state 610, where it begins copying data from the source extent 700a to the target extent 700b. When most or all of the data is copied, the migration agent 604 transitions to the "hold" state 612. In the "hold" state 612, the migration agent 604 finishes copying the data and waits for ongoing destages to complete. Destages to the data or metadata are held in the queue 630 while in the "hold" state 612. When the data has been copied to the target extent 700b and destages are complete, the migration agent 604 transitions to the "metadata copy" state 614. For standard volumes, metadata is copied from the source extent 700a to the target extent 700b while in the "metadata copy" state 614. For thin-provisioned volumes, no metadata is copied since the metadata resides in a separate physical extent. The migration agent 604 then updates the pointer (i.e., the single pointer 400, in the case of standard volumes, or the pointer 400a pointing to the data extent, in the case of thin-provisioned volumes) to point to the target extent 700b.

Figure 9:
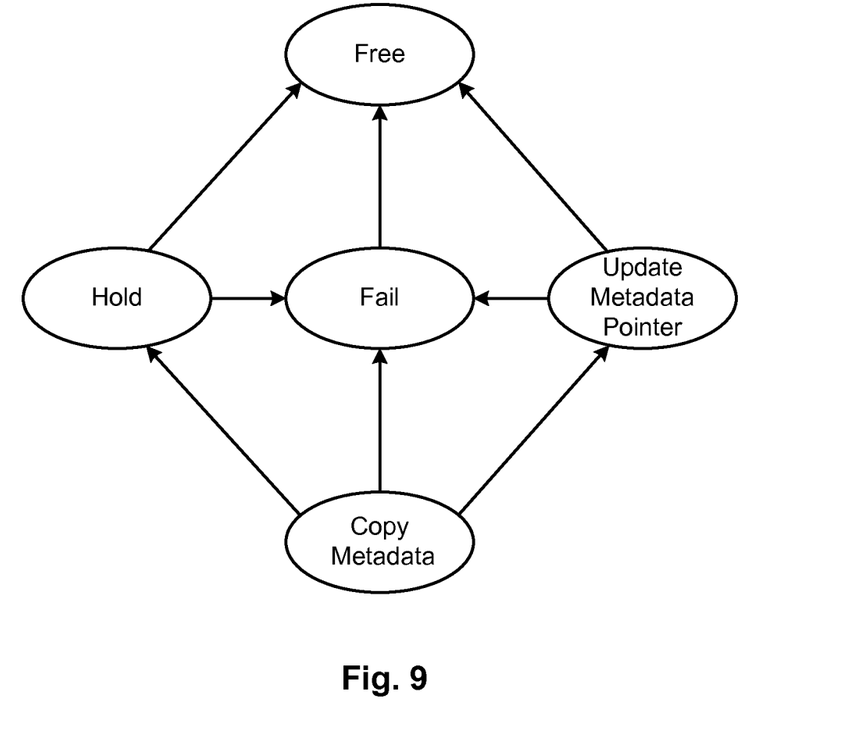
FIG. 9 is a state diagram showing transitions between states when copying metadata of a thin-provisioned volume from a source extent to a target extent.

FIG. 9 shows a state diagram for the migration agent 604 when copying metadata 404 from a source extent to a target extent for a thin-provisioned volume. As shown, the migration agent 604 begins in the "free" state 608 and then transitions directly to the "hold" state 612. In the "hold" state 612, the migration agent 604 retains destages to the source extent in the queue 630. The migration agent 604 then transitions to the "metadata copy" state 614. When the metadata 404 is fully copied from the source extent to the target extent, the migration agent 604 updates the metadata pointer 400b of the thin-provisioned volume to point to the target extent.

The flowcharts and block diagrams in the Figures illustrate the architecture, functionality, and operation of possible implementations of apparatus, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for migrating volumes in a storage system, the method comprising:
   identifying an extent of data and associated metadata requiring migration from a source extent to a target extent, wherein the source extent is in a first storage tier and the target extent is in a second storage tier with different performance characteristics than the first storage tier;
   identifying a control structure comprising a single pointer pointing to both the extent of data and the associated metadata;
   migrating at least one of the extent of data and associated metadata from the source extent to the target extent; and
   modifying the control structure to include separate pointers to the extent of data and the associated metadata.

2. The method of claim 1, further comprising:
   allocating a selected number of copiers to the extent of data to migrate the extent, wherein each copier is configured to copy a unit of data, the extent of data comprising a plurality of units;
   monitoring destages that occur to the source extent as the copiers migrate the extent of data from the source extent to the target extent;
   in the event the destages occur to the source extent faster than the copiers can copy units to the target extent, allocating additional copiers to the extent of data to assist in migrating the extent of data; and
   limiting the number of copiers that can be allocated to a maximum number.

3. The method of claim 2, further comprising, in the event the destages occur to the source extent faster than the maximum number of copiers copy units to the target extent, throttling back the destages.

4. The method of claim 3, wherein throttling back the destages comprises holding the destages in a queue.

5. The method of claim 4, wherein throttling back the destages comprises releasing the destages from the queue at a rate slower than the copiers copy units to the target extent.

6. The method of claim 4, further comprising, in the event a number of units remaining to be copied from the source extent to the target extent falls below a specified threshold, discontinuing destages to the source extent.

7. The method of claim 1, wherein modifying the control structure comprises modifying the control structure at the time of migration.

8. The method of claim 1, wherein the extent of data and associated metadata are tied together prior to migration and independent from one another after migration.

9. A computer program product for migrating volumes in a storage system, the computer program product comprising a non-transitory computer-readable storage medium having computer-usable program code embodied therein, the computer-usable program code comprising:
    computer-usable program code to identify an extent of data and associated metadata requiring migration from a source extent to a target extent, wherein the source extent is in a first storage tier and the target extent is in a second storage tier with different performance characteristics than the first storage tier;
    computer-usable program code to identify a control structure comprising a single pointer pointing to both the extent of data and the associated metadata;
    computer-usable program code to migrate at least one of the extent of data and associated metadata from the source extent to the target extent; and
    computer-usable program code to modify the control structure to include separate pointers to the extent of data and the associated metadata.

10. The computer program product of claim 9, further comprising computer-usable program code to:
    allocate a selected number of copiers to the extent of data to migrate the extent wherein each copier is configured to copy a unit of data, the extent of data comprising a plurality of units;
    monitor destages that occur to the source extent as the copiers migrate the extent of data from the source extent to the target extent;
    in the event the destages occur to the source extent faster than the copiers can copy units to the target extent, allocate additional copiers to the extent of data to assist in migrating the extent of data; and
    limit the number of copiers that can be allocated to a maximum number.

11. The computer program product of claim 10, further comprising computer-usable program code to, in the event the destages occur to the source extent faster than the maximum number of copiers copy units to the target extent, throttle back the destages.

12. The computer program product of claim 11, wherein throttling back the destages comprises holding the destages in a queue.

13. The computer program product of claim 12, wherein throttling back the destages comprises releasing the destages from the queue at a rate slower than the copiers copy units to the target extent.

14. The computer program product of claim 12, further comprising computer-usable program code to, in the event a number of units remaining to be copied from the source extent to the target extent falls below a specified threshold, discontinue destages to the source extent.

15. The computer program product of claim 9, wherein modifying the control structure comprises modifying the control structure at the time of migration.

16. The computer program product of claim 15, wherein the extent of data and associated metadata are tied together prior to migration and independent from one another after migration.

17. An apparatus for migrating volumes in a storage system, the apparatus comprising:
    at least one processor;
    at least one memory device coupled to the at least one processor and storing computer instructions for execution on the at least one processor, the computer instructions causing the at least one processor to:
        identify an extent of data and associated metadata requiring migration from a source extent to a target extent, wherein the source extent is in a first storage tier and the target extent is in a second storage tier with different performance characteristics than the first storage tier;
        identify a control structure comprising a single pointer pointing to both the extent of data and the associated metadata;
        migrate at least one of the extent of data and associated metadata from the source extent to the target extent; and
        modify the control structure to include separate pointers to the extent of data and the associated metadata.

18. The apparatus of claim 17, wherein the computer instructions further cause the at least one processor to:
    allocate a selected number of copiers to the extent of data to migrate the extent wherein each copier is configured to copy a unit of data;
    monitor destages that occur to the source extent as the copiers migrate the extent of data from the source extent to the target extent;
    in the event the destages occur to the source extent faster than the copiers can copy units to the target extent, allocate additional copiers to the extent of data to assist in migrating the extent of data; and
    limit the number of copiers that can be allocated to a maximum number.

19. The apparatus of claim 18, wherein the computer instructions further cause the at least one processor to, in the event the destages occur to the source extent faster than the maximum number of copiers copy units to the target extent, throttle back the destages.

20. The apparatus of claim 19, wherein throttling back the destages comprises holding the destages in a queue.

21. The apparatus of claim 20, wherein throttling back the destages comprises releasing the destages from the queue at a rate slower than the copiers copy units to the target extent.

22. The apparatus of claim 20, wherein the computer instructions further cause the at least one processor to, in the event a number of units remaining to be copied from the source extent to the target extent falls below a specified threshold, discontinue destages to the source extent.

23. The apparatus of claim 17, wherein modifying the control structure comprises modifying the control structure at the time of migration.

24. The apparatus of claim 23, wherein the extent of data and associated metadata are tied together prior to migration and independent from one another after migration.

* * * * *